(12) United States Patent
Gilles et al.

(10) Patent No.: US 10,474,102 B2
(45) Date of Patent: Nov. 12, 2019

(54) METHOD FOR DIGITALLY GENERATING A HOLOGRAM, RELATED DEVICE AND COMPUTER PROGRAM

(71) Applicants: B<>COM, Cesson Sevigne (FR); Orange, Paris (FR); Universite De Rennes 1, Rennes (FR); INSA De Rennes, Rennes (FR)

(72) Inventors: Antonin Gilles, Rennes (FR); Patrick Gioia, Servin sur Vilaine (FR); Remi Cozot, Yvignac le Grand (FR); Luce Morin, Rennes (FR)

(73) Assignee: B<>COM, Cesson Sevigne (FR)

( * ) Notice: Subject to any disclaimer, the term of this patent is extended or adjusted under 35 U.S.C. 154(b) by 52 days.

(21) Appl. No.: 15/573,723

(22) PCT Filed: May 10, 2016

(86) PCT No.: PCT/FR2016/051087
§ 371 (c)(1),
(2) Date: Nov. 13, 2017

(87) PCT Pub. No.: WO2016/181061
PCT Pub. Date: Nov. 17, 2016

(65) Prior Publication Data
US 2018/0143589 A1    May 24, 2018

(30) Foreign Application Priority Data
May 13, 2015 (FR) ..................... 15 54363

(51) Int. Cl.
*G03H 1/08* (2006.01)
*G03H 1/26* (2006.01)
*G03H 1/04* (2006.01)

(52) U.S. Cl.
CPC ........... *G03H 1/268* (2013.01); *G03H 1/0406* (2013.01); *G03H 1/0443* (2013.01);
(Continued)

(58) Field of Classification Search
CPC ..... G03H 1/268; G03H 1/0808; G03H 1/0406
(Continued)

(56) References Cited

PUBLICATIONS

"Exact hidden-surface removal in digitally synthetic full-parallax holograms" by Matsushima (Proceedings of SPIE, SPIE, US vol. 5742, Jan. 25, 2005 (Jan. 25, 2005) pp. 25-32).*
International Search Report and Written Opinion dated Jul. 4, 2016 for International Application No. PCT/FR2016/051087, filed May 10, 2016.
(Continued)

*Primary Examiner* — Audrey Y Chang
(74) *Attorney, Agent, or Firm* — David D. Brush; Westman, Champlin & Koehler, P.A.

(57) ABSTRACT

A method for digitally generating a hologram plane from a three-dimensional scene, cut into a plurality of planes parallel to the hologram plane. The method includes for a current plane: counting a number of points of the non-zero amplitude scene; choosing a first or second technique for propagating a light wave emitted by the current plane as a function of a number of points of non-zero amplitude included in the current plane and with a preset threshold value, the first, point-based technique calculating the propagation of a sum of light waves emitted by point sources constituted by the points of the scene portion of a non-zero amplitude of the current plane on a following plane, and the second, field-based technique, globally calculating a light wave emitted by the scene portion situated in the current plane on a given plane; and processing the current plane according to the chosen propagation technique.

12 Claims, 9 Drawing Sheets

(52) U.S. Cl.
CPC ... *G03H 1/0808* (2013.01); *G03H 2001/0428* (2013.01); *G03H 2001/0452* (2013.01); *G03H 2001/269* (2013.01); *G03H 2210/36* (2013.01); *G03H 2210/452* (2013.01); *G03H 2210/454* (2013.01); *G03H 2226/02* (2013.01)

(58) Field of Classification Search
USPC .............................................. 359/9, 22, 35
See application file for complete search history.

(56) References Cited

PUBLICATIONS

English Translation of the International Search Report and Written Opinion dated Jul. 4, 2016 for International Application No. PCT/FR2016/051087, filed May 10, 2016.
French Search Report and Written Opinion dated Sep. 15, 2015 for French Application No. 1554363, filed May 13, 2015.
Underkoffler John: "Occlusion processing and smooth surface shading for fully computed syntheticholography", Proceedings of SPIE, SPIE—International Society for Optical Engineering, US, vol. 3011, Feb. 10, 1997 (Feb. 10, 1997-02-10), pp. 19-30, XP007903740.
Matsushima K: "Exact hidden-surface removal in digitally synthetic full-parallax holograms", Proceedings of SPIE, SPIE, US, vol. 5742, Jan. 25, 2005 (Jan. 25, 2005), pp. 25-32, XP040200952.
Phong, "Illumination for Computer Generated Pictures" vol. 18, No. 6, "Communications of the ACM ", pp. 311-317, Jun. 1975.
Goodman, "Introduction to Fourier Optics", pp. 55 to 61, published by Roberts and Company Publishers in 2005.

* cited by examiner

METHOD FOR DIGITALLY GENERATING A HOLOGRAM, RELATED DEVICE AND COMPUTER PROGRAM

1. CROSS-REFERENCE TO RELATED APPLICATIONS

This Application is a Section 371 National Stage Application of International Application No. PCT/FR2016/051087, filed May 10, 2016, the content of which is incorporated herein by reference in its entirety, and published as WO 2016/181061 on Nov. 17, 2016, not in English.

2. FIELD OF THE INVENTION

The field of the invention is that of the digital generation of a hologram light field.

3. DESCRIPTION OF THE STATE OF THE ART

Holography is often regarded as the most promising 3D visualization technology since it provides the most natural and realistic relief illusion possible without the need for glasses and without visual fatigue. Indeed, this technology makes it possible to provide all the indices of perception of the depth of the human visual system. In recent years, several methods of numerical generation of holograms have been suggested. Using these methods, it is possible to obtain the hologram of a real or synthetic scene by simulating the propagation of light from the scene to the plane of the hologram.

The document on generation by J. S. Underkoffler, entitled "Occlusion Processing and smooth surface shading for fully computed synthetic holography", published in the proceedings of the conference on "Practical Holography XI and Holographic Materials II, in April 1997, Proc. SPIE 3011, pp. 19-30, 00048, discloses a digital hologram generation technique comprising breaking down the scene into a cloud of light spots and calculating the light wave from the scene as the sum of the spherical waves emitted by each of the points. In the rest of this article, this approach will be called a "point-based" approach. This point-based approach is very flexible and imposes no restrictions on the geometry of the scene. However, the algorithmic complexity of this approach is quite significant since it requires a point-based and a pixel-based computation of the hologram. Moreover, for the surfaces to appear continuous, the scene must be sampled using a very large number of points, making the generation of the hologram far too slow. In order to reduce the algorithmic complexity of this approach, several methods have been suggested, based on the use of pre-calculated correspondence tables, reduction of spatial redundancies, the use of recursion formulas, the use of intermediate plans, or the use of graphic cards or specific hardware. Moreover, it is possible to reduce the number of visibility tests necessary for managing the occultations by grouping the pixels of the hologram or still by grouping the points of the scene.

The document by K. Matsushima, entitled "Exact hidden-surface removal in digitally synthetic full-parallax holograms", published in the Proceedings of the conference on "Practical holography XIX: Material and Applications", held in San Jose, Calif., in 2005, discloses another approach comprising breaking down the scene into a set of planes parallel to the plane of the hologram and calculating the propagation of the light wave from the scene from one plane to another in using light propagation formulas such as the angular spectrum formula. In the following, this approach will be called a "field-based" approach. The computation of the angular spectrum requiring two Fast Fourier Transforms (FFT), its algorithmic complexity is more important than that of the calculation of the spherical wave from a point. On the other hand, the wave emitted by each of the points included in the same plane is calculated in a single time thanks to the angular spectrum. Thus, this approach is more efficient than the point-based approach when the objects in the scene are made up of large planes parallel to the plane of the hologram. On the other hand, when the scene comprises more complex shapes, a large number of planes containing few points is needed to sample it, making this approach less efficient than the point-based approach.

Whatever the method used, an important constraint in holography is the ability to restore the occultations between the objects of the scene. Indeed, the occultations in the scene constitute one of the most important indices of perception of depth. Taking into account occultations in digital generation of holograms is equivalent to determining hidden surfaces in image synthesis. However, unlike synthetic images, a digitally generated hologram provides the parallax of motion, which is related to occultations. Thus, taking into account occultations in digital generation of holograms implies that the visible objects change according to the user's viewpoint. The techniques of occultation management depend on the approach used.

In the point-based approach, occultations between objects in the scene are usually taken into account by performing a visibility test to check for the presence or absence of obstacles between each point of the scene and each pixel of the hologram.

In the field-based approach, occultations between objects in the scene are taken into account at each diffraction stage by multiplying the incident light field on a given plane by the binary mask of this plane, thereby eliminating the need to carry out a test of visibility.

4. SHORTCOMINGS OF THE PRIOR ART

The point-based method is very computational and the field-based method is not suited to real scenes including complex shapes.

5. SUMMARY OF THE INVENTION

An exemplary embodiment of the present invention relates to a method for digitally generating a hologram in a plane, known as the hologram plane, from a three-dimensional scene, comprising a step of cutting said scene into a plurality of planes parallel to the plane of the hologram.

The method according to the invention is particular in that it comprises the following steps, implemented for a plane of the plurality of planes, referred to as the current plane, the planes being browsed from the farthest to the nearest to the plane of the hologram:

counting a number of points of the non-zero amplitude scene in the current plane;
choosing a first or a second technique for propagating a light wave emitted by the current plane as a function of a number of points of non-zero amplitude of the scene portion comprised in the current plane and with a preset threshold value, the first, so-called point-based technique for calculating the propagation of a sum of light waves emitted by point sources constituted by the points of the scene portion of a non-zero amplitude of the current plane on a following plane, the second, so-called field-based technique, for calculating globally the propagation of a light field emitted by the scene portion comprised in the current plane on a following plane, the first technique being chosen if the number of points is strictly lower than the preset threshold value and the second, otherwise;

processing the current plane according to the chosen propagation technique, for calculating a light wave emitted by the current plane.

According to the invention, said steps are repeated for the plurality of planes and the method further comprises a step of obtaining the hologram from the light waves calculated for the plurality of planes.

While the methods of the state of the art are based on breaking down the scene into a plurality of planes that they process either globally according to a field-based technique or locally according to a point-based technique, the invention uses both approaches jointly and thus makes use of the advantages of each of them.

First, the scene is decomposed into a set of planes parallel to the plane of the hologram. Then, the light wave from the scene is propagated from one plane to another starting from the remotest plane. According to the number of points of the scene included in a plane, the light wave emitted by the points of the scene is calculated either by considering each point independently or by considering the plane as a whole. Finally, the light wave is propagated to the plane of the hologram in order to obtain the final hologram.

With the invention, the method most adapted to the scene is chosen. The planes comprising a small number of points of non-zero amplitude are advantageously processed by the point-based method at a reasonable cost, whereas the planes comprising a number of points greater than the value of a predetermined threshold are treated globally by the field-based method.

According to one aspect of the invention, said step of processing the current plane comprises the following substeps:

identifying the last plane processed according to the second technique, so-called last field-based plane;

calculating the light wave emitted by the scene portion comprised in the current plane;

when the second technique has been chosen for the current plane, so-called field-based plane, the processing step comprises the following substeps:

calculating a propagation of the light wave emitted by at least the last field-based plane on the current plane, according to the technique chosen for said plane;

calculating the light wave emitted by the current plane by summing the light wave emitted by the current plane and at least the propagation of the light wave emitted by at least the last field-based plane; and the step of obtaining the hologram comprises calculating the propagation of the light wave emitted by the field-based plane closest to the hologram on the plane of the hologram.

Advantageously, the invention processes the propagation of light waves step by step from one field-based plane to the next. The hologram is obtained by simple propagation of the light field calculated by the field-based plane closest to the plane of the hologram, according to the second technique.

According to yet another aspect of the invention, when said at least one previous plane further comprises at least one point-based plane interposed between the last field-based plane and the current plane, calculating the propagation of the emitted light wave by at least the last field-based plane on the current plane further comprises calculating a propagation of the light wave emitted by the points of non-zero amplitude of the scene portion comprised in said at least one intermediate plane on the current plan according to the first technique.

The light waves emitted by point-based intermediate planes are also propagated directly to the current field-based plane. In this way, the invention manages only the propagation of a light wave from a point-based plane on a field-based plane, the complexity of which depends on the number of points of non-zero amplitude initially present in the scene portion comprised in the point-based plane. An advantage is to master the computational complexity of the method suggested.

According to an advantageous characteristic of the invention, the step of processing the current plan comprises a substep for managing an occultation of the light wave propagated by at least the last field-based plane in the current plane by applying a non-binary mask masking said light wave, said mask taking a null value at the points of the scene portion comprised in the current plane and a non-zero value outside this portion, and in that the substep of calculating of the total light wave emitted by the current plane comprises a summation of the light wave emitted by the current plane to the light wave obtained after applying the occulting mask.

In this way, for a current field-based plane, the light wave from the previous planes is not propagated at the non-zero points of the scene portion comprised in the current plane.

According to yet another aspect of the invention, when the first technique has been chosen to process the current plane, so-called point-based plane, the processing step further comprises the following substeps:

calculating a light wave propagated by at least the last field-based plane according to the first technique and blocked by the points of non-zero amplitude of the scene portion comprised in the current plane;

calculating the light wave emitted by the current plane by subtracting the light wave blocked by the points of non-zero amplitude of the scene portion comprised in the current plane to the light wave emitted by said points.

The invention makes it possible to manage the occultations due to the point-based intermediate planes, while mastering the computational complexity of the method. Indeed, it avoids creating new points in point-based planes by propagating the light field of a previous point-based plane or the light waves of a previous point-based plane, so as not to illuminate additional points in the current point-based plane and not to increase the computation time due to the processing of the current point-based plane. Instead, it suggests calculating, for each point-based intermediate plane, the amplitude of the light wave blocked by the scene in this plane and to propagate it to the next field-based plane. In this way, it transmits to the next field-based plane the information relating to the quantity of light wave from the previous planes which is occulted by this intermediate plane. The amplitude of the blocked light wave is then subtracted from that of the light wave from the previous planes which had been propagated directly to the next field-based plane as if there were no occulting by the intermediate planes. Thus, the invention suggests an astute solution to the problem of managing occultations between two planes of a different nature, which for a given plane does not question the principle of choosing a propagation technique adapted to the complexity of the portion of scene comprised in this plane.

According to yet another aspect of the invention, the substep of calculating the blocked light wave comprises calculating the light waves propagated at least by the last field-based plane according to the first technique and applying an inverted occulting binary mask to the light wave, said mask assuming a non-zero value at the points of the scene portion comprised in the current plane and a zero value outside this portion.

A first advantage of this technique of inverted mask is that it makes it possible simply to obtain the amplitude of the light waves blocked by the current point-based plane.

A second advantage is that it makes it possible to limit the calculation of the blocked wave to the points of non-zero amplitude of the scene, since elsewhere the inverted binary mask assumes a zero value.

According to another aspect of the invention, the substep of calculating the blocked light wave comprises cutting into a plurality of zones of the current plane, determining the points of a previous plane from the last field-based plane, contributing to the propagation of a light wave in a zone of the plurality of zones comprising points of non-zero amplitude of the scene portion comprised in the current plane, and calculating the blocked light wave only for the points thus determined.

Advantageously, the calculation is limited to the preceding points of the plane which help illuminate the non-zero points of the scene comprised in the current plane.

According to one aspect of the invention, the method comprises a step of evaluating the threshold at least as a function of an estimated processing time for the first propagation technique, of an estimated processing time for the second propagation technique for the current plane, and a number of non-zero amplitude points of the scene portions comprised in the previous planes.

Advantageously, the threshold is evaluated specifically for each plane of the scene, which guarantees to choose, for this plane, the least expensive method in terms of computing time. The estimated processing times for each of the propagation techniques can also take into account the management of the occultation according to the invention.

The method which has just been described in its various embodiments is advantageously implemented by a device for digitally generating a hologram in a plane, so-called hologram plane, from a three-dimensional scene comprising a unit for cutting said scene into a plurality of planes parallel to the plane of the hologram.

Such a device includes the following units, which can be implemented for a plane of the plurality of planes, so-called current plane, the planes being browsed from the farthest to the nearest to the plane of the hologram:
  counting a number of points of the non-zero amplitude scene in the current plane;
  choosing a first or a second technique for propagating a light wave emitted by the current plane as a function of a number of points of non-zero amplitude of the scene portion included in the current plane and with a preset threshold value, the first, so-called point-based, technique for calculating the propagation of a sum of light waves emitted by point sources constituted by the points of the scene portion of a non-zero amplitude of the current plane on a following plane, the second, so-called field-based technique, for calculating globally the propagation of a light field emitted by the scene portion comprised in the current plane on a following plane, the first technique being chosen if the number of points is strictly lower than the preset threshold value and the second, otherwise;
  processing the current plane according to the chosen propagation technique, for calculating a light wave emitted by the current plane.

According to the invention, the implementation of said steps is repeated for the plurality of planes and the device further comprises a unit for obtaining the hologram from the light waves calculated for the plurality of planes.

Correspondingly, the invention also relates to a user terminal comprising a module for controlling a device for reproducing a hologram. Said terminal further comprises a device for digitally generating said hologram according to the invention.

The invention also relates to a computer program comprising instructions for implementing the steps of a method for digitally generating a hologram as described above, when this program is carried out by a processor.

This program can use any programming language. It can be downloaded from a communication network and/or recorded on a computer-readable medium.

Finally, the invention relates to a processor-readable recording medium, integrated or not integrated into the optionally removable device for digitally generating a hologram, storing respectively a computer program implementing a method for digitally generating a hologram, as described previously.

6. LIST OF FIGURES

Other features and advantages of the invention will become evident on reading the following description of one particular embodiment of the invention, given by way of illustrative and non-limiting example only, and with the appended drawings among which:

Figure 4:
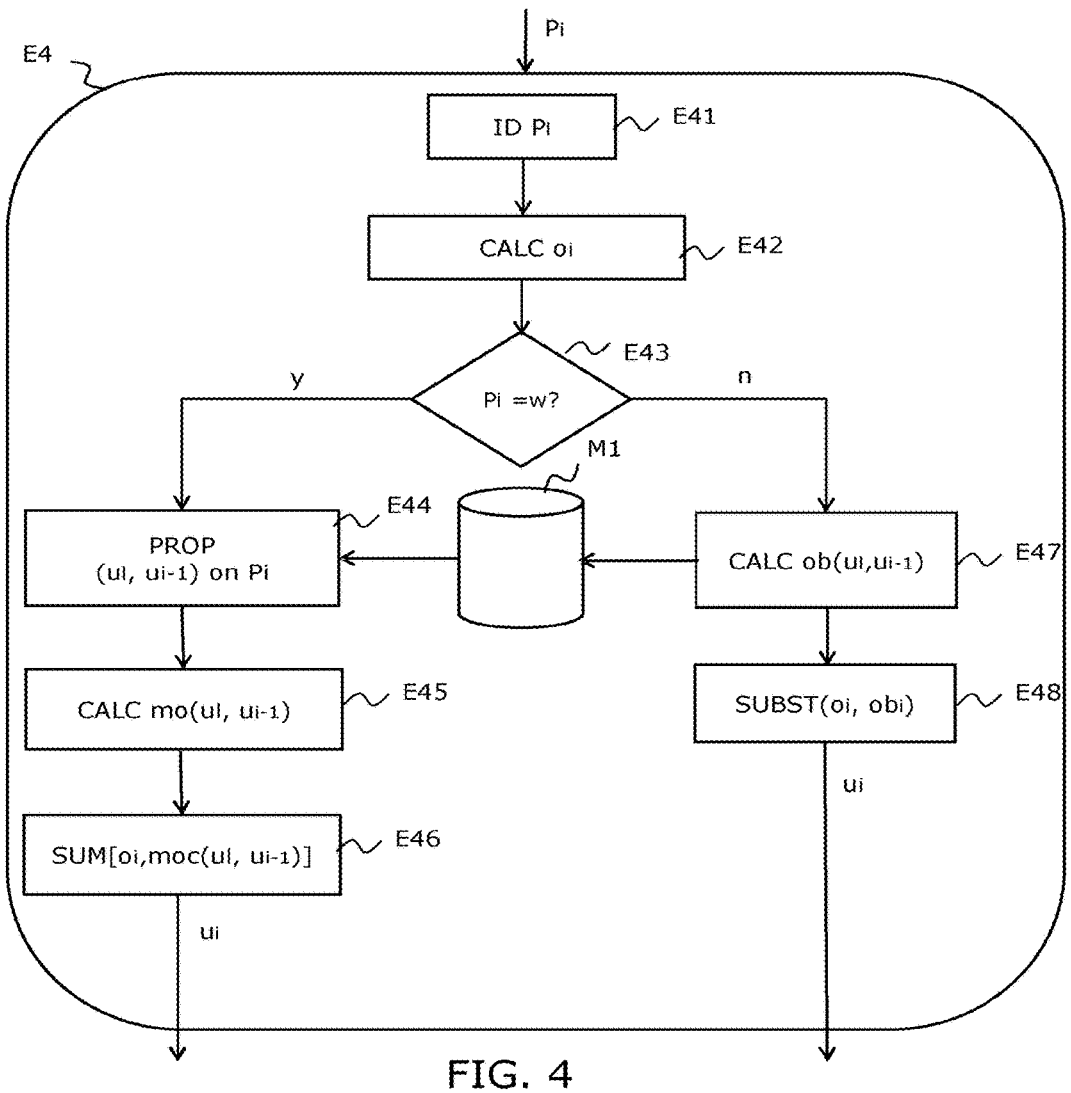
Figure 5:
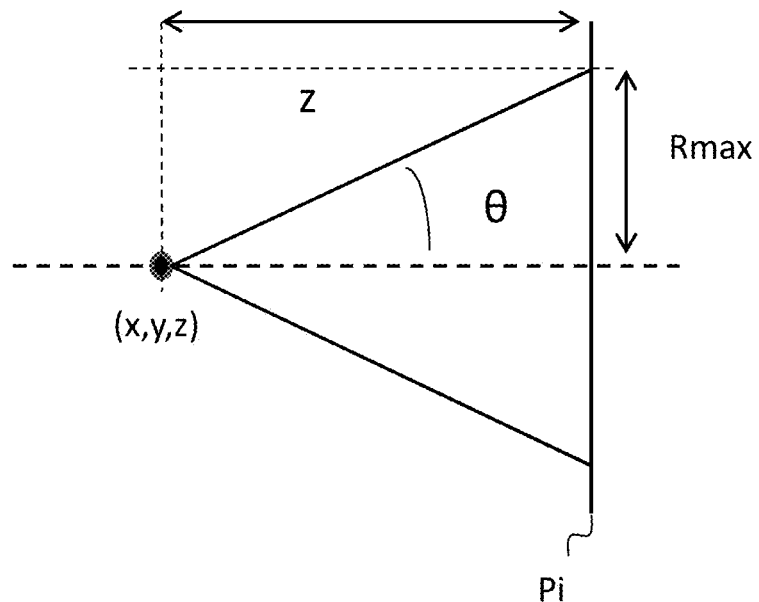
Figure 6:
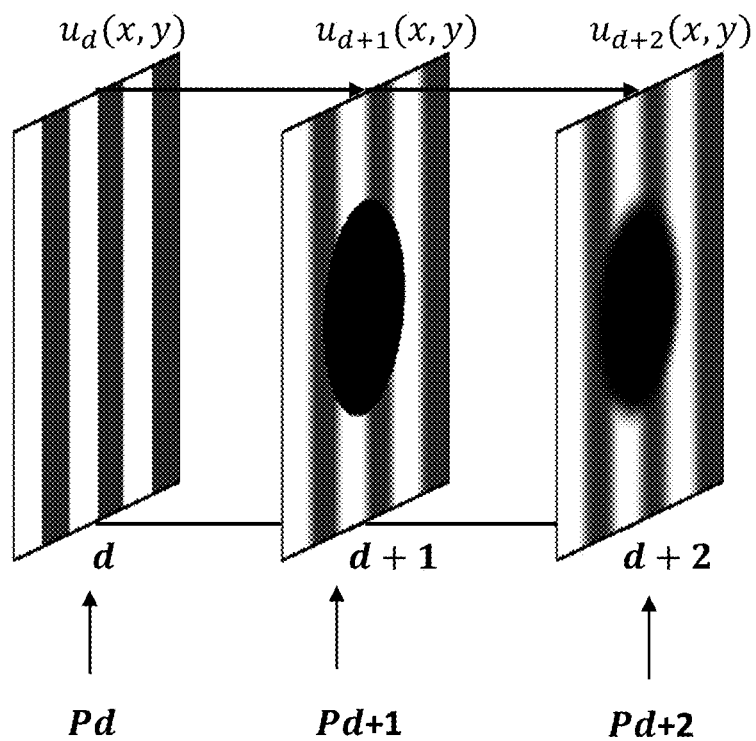
Figure 7:
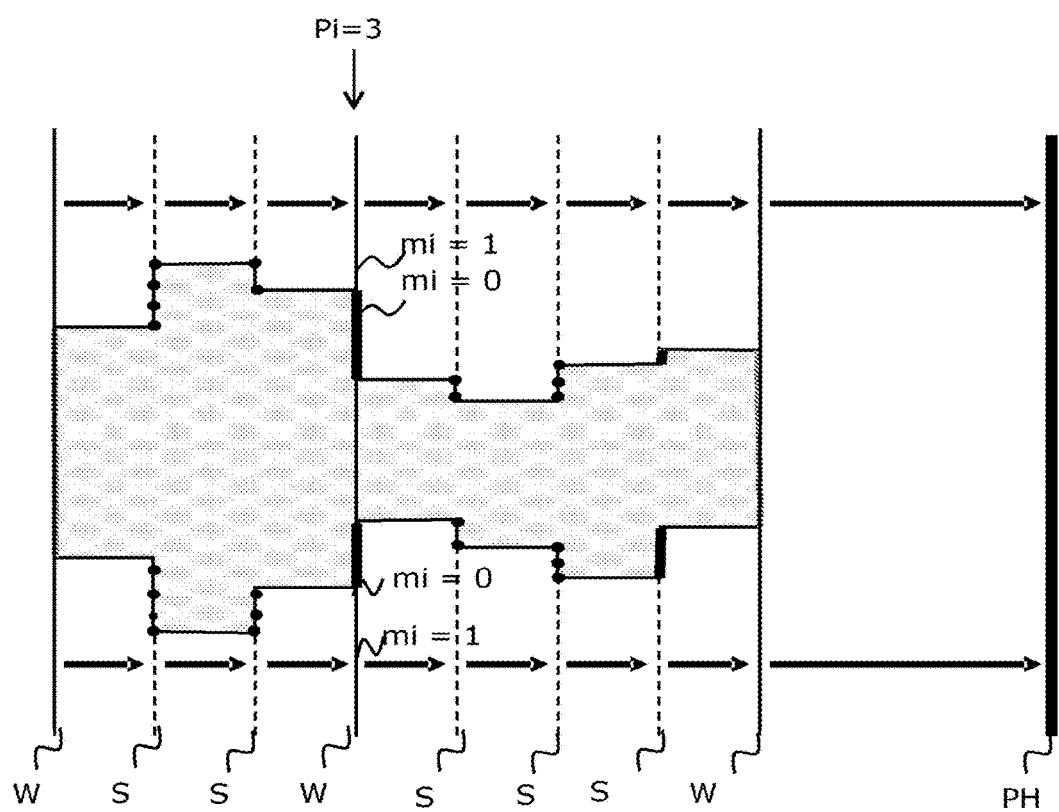
Figure 8:
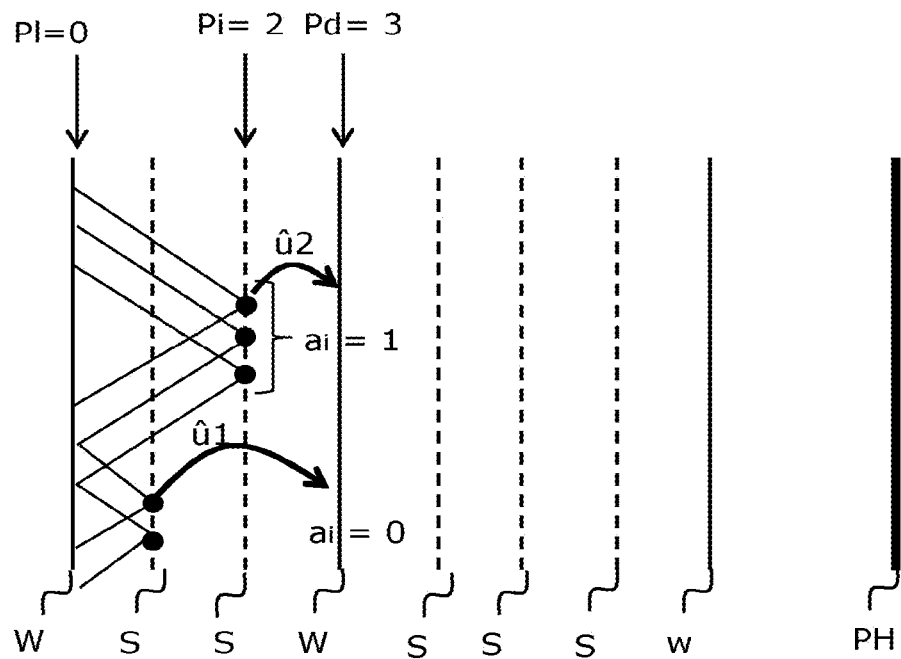
Figure 9:
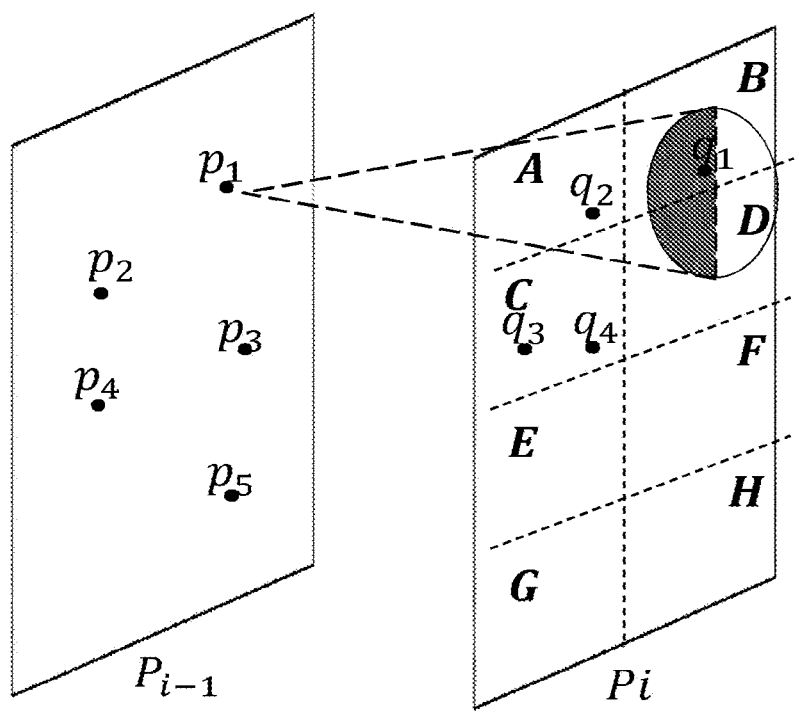
Figure 10:
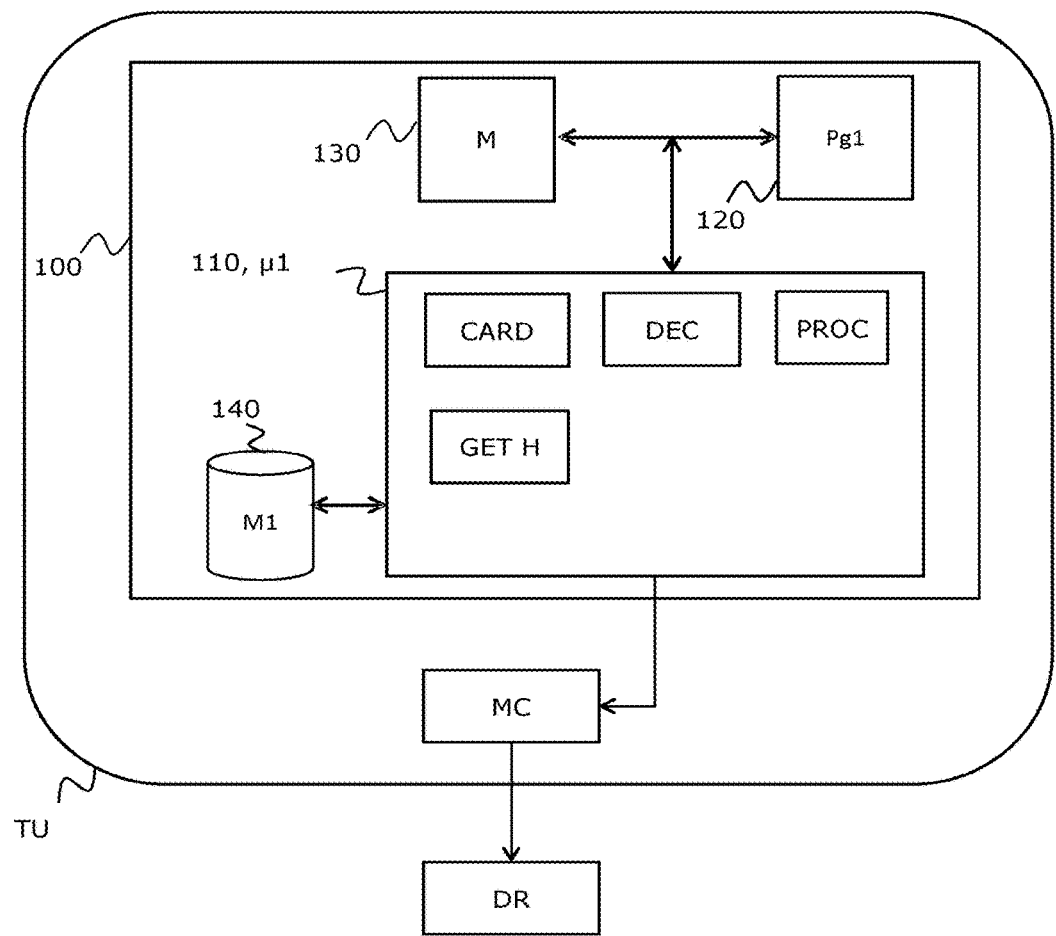
Figure 11:
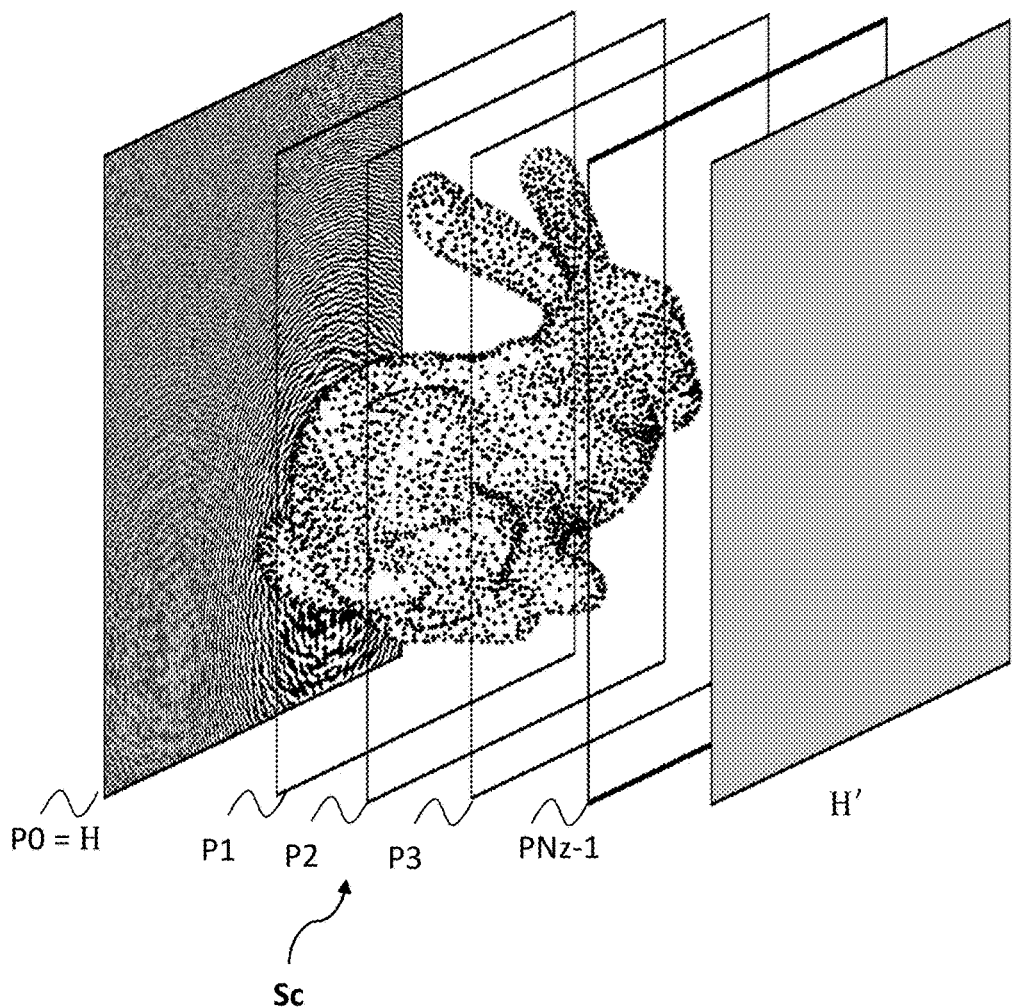

FIG. 4 details the step of processing a current plane according to one embodiment of the invention;

FIG. 5 schematically illustrates a contribution region of a light spot by taking into account the technique of propagation of a point-based light wave;

FIG. 6 illustrates schematically the processing of the light waves propagated by the previous planes on a field-based plane according to the invention;

FIG. 7 shows schematically an example of an occulting mask implemented by the invention for the portion of scene within a field-based plane;

FIG. 8 shows schematically the inverted occulting mask implemented by the invention to a point-based plane, according to an embodiment of the invention;

FIG. 9 illustrates schematically the principle of one embodiment of the invention to simplify the calculation of occulting light waves of the scene portion comprised in a point-based plane;

FIG. 10 shows schematically the hardware structure of a digital device for generating a hologram field according to the invention; and FIG. 11 illustrates another example of use of the invention.

7. DESCRIPTION OF A PARTICULAR EMBODIMENT OF THE INVENTION

Figure 1:
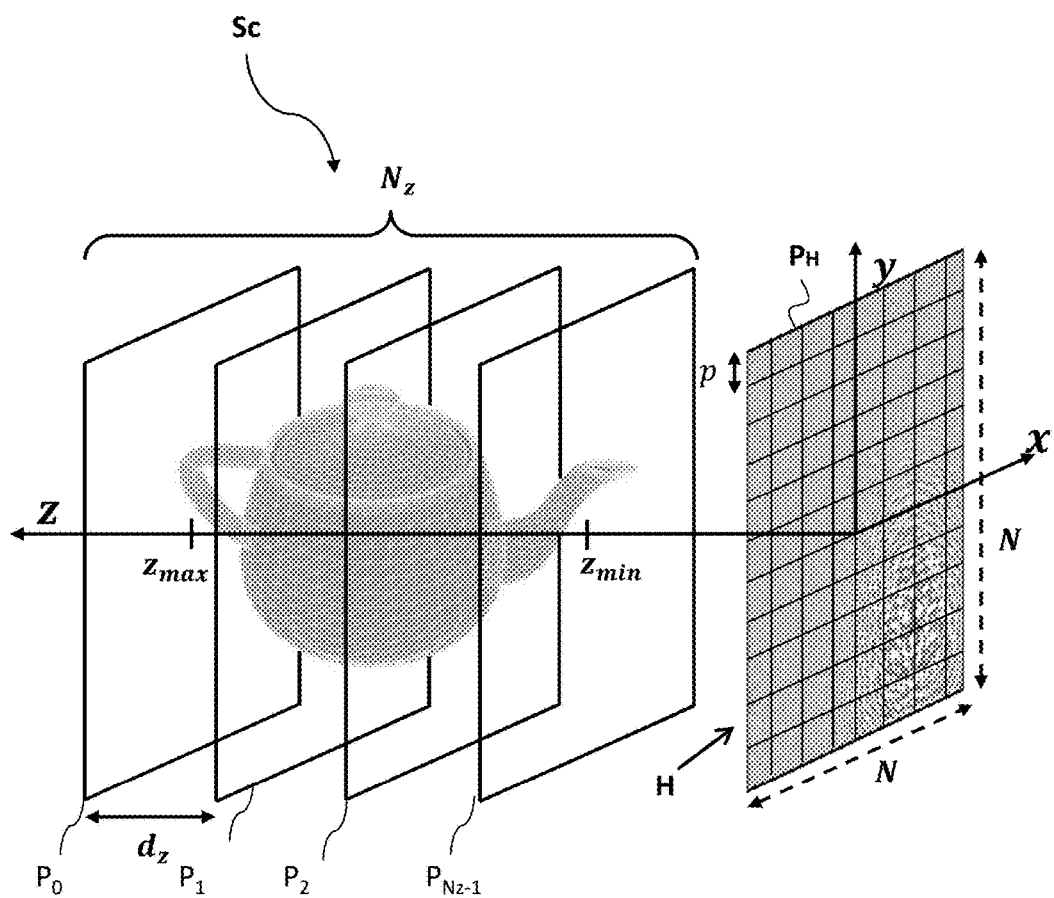
FIG. 1 illustrates an exemplary three dimensional scene cut into a plurality of planes parallel to the hologram plane.

The general principle of the invention is based on the cutting of a three-dimensional scene into a plurality of planes parallel to the plane of the hologram and on a hybrid solution of digital hologram generation, implementing a first point-based technique for the planes comprising a limited number of points of the non-zero amplitude scene and a second field-based technique for the planes comprising a larger number of points of the scene. In connection with FIG. 1, the geometry of the three-dimensional scene Sc comprising a kettle, a plane $P_H$, so-called hologram plane, on which a hologram representative of the scene Sc must be generated digitally and a plurality of planes $P_0, P_1, \ldots P_{N_z-1}$ with $N_z$ a non-zero integer, greater than or equal to 2, parallel to the hologram plane $P_H$. A referential (O, x, y, z) is considered as well, so that the hologram is inscribed in the plane (O, x, y) and the axis Oz is perpendicular to $P_H$ and to the plurality of planes $P_i$. For example, the planes $P_i$ are situated at equal distance $d_z$ from one another. $P_0$ is the remotest plane from the hologram plane at the $z_{max}$ of $P_H$ and $P_{N_z-1}$ is the closest plane to the hologram plane, at distance $z_{min}$ of $P_H$, with $z_{min} < z_{max}$. The distance $d_z$ is thus given by:

$$d_z = \frac{z_{max} - z_{min}}{N_z} \quad (1)$$

The planes $P_0, \ldots P_{N_z-1}$ and the hologram point $P_H$ are samples on a regular grid of N×N resolution with a sampling step p.

In the following, the section of the three-dimensional scene Sc between the plane $P_i$, with i an integer between 0 and $N_z-1$, shall be designated the section of the three-dimensional scene Sc between plane $P_i$ and plane $P_{i+1}$. In connection with FIG. 2, the method for digitally generating a hologram in the plane $P_H$ for scene Sc is described according to an embodiment of the invention. The planes $P_0$ t $P_{N_z-1}$ are processed successively from the furthest to the closest to the hologram. The first plane $P_0$ and the last plane $P_{N_z-1}$ are processed according to the field-based method. For a plane $P_i$, with i=1 ... $N_z-2$, during a step E1, the number of points of the portion of scene included in this plane are counted, i.e. points whose coordinate z ranges between $z_{max}-id_z$ and $z_{max}-(i+1)d_z$, whose amplitude is different from zero. The result is a number $M_i$.

During a step E2, a threshold $M_{i,max}$ is evaluated on the basis of an estimate of a processing time of the current plane according to the first method and a time of calculation of the current plane according to the second method. An example of calculating the value of the threshold $M_{i,max}$ will be detailed in the following description.

In E3, the number of points $M_i$ obtained is compared with the estimated threshold $M_{i,max}$.

If $M_i \geq M_{i,max}$, it is decided to implement the second, so-called field-based method, to process the current plane $P_i$. The plane $P_i$ is then designated "field-based" plane.

Figure 3:
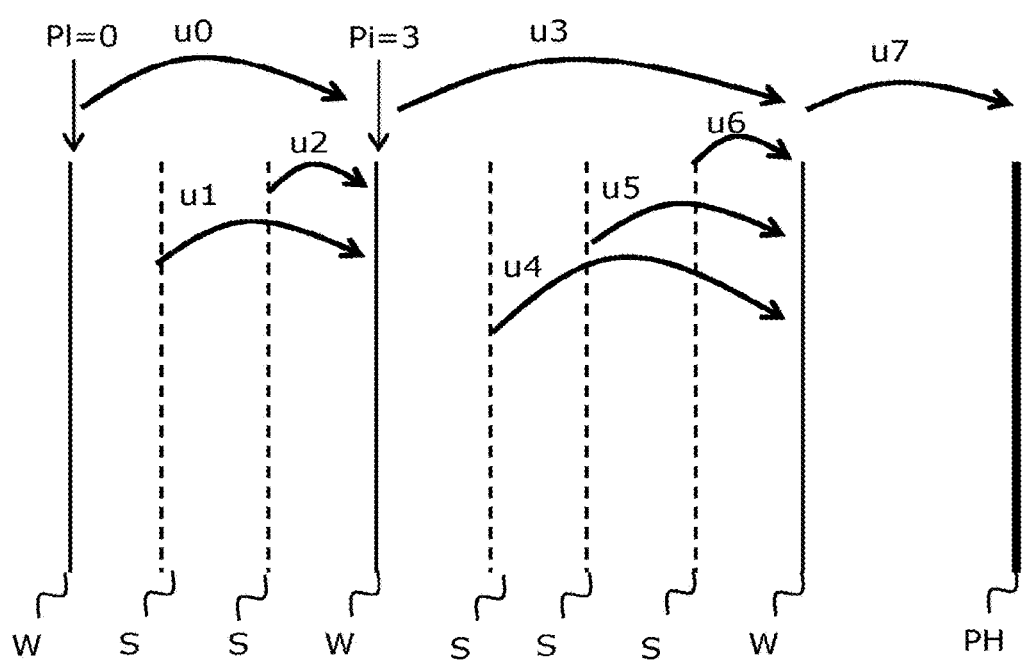
FIG. 3 shows schematically the cutting of a three-dimensional scene in a plurality of planes parallel to the hologram plane and the propagation of light waves between two successive field-based planes according to an embodiment of the invention.

In connection with FIG. 3, an example of cutting into successive planes $P_0$ to $P_{N_z-1}$ is shown. The planes $P_0$, $P_3$ and $P_7$ are field-based planes. The planes $P_1$, $P_2$, $P_4$, $P_5$ and $P_6$ are so-called "point-based" planes.

In E4, the current plane $P_i$ is processed according to the propagation technique chosen. This step supplies the total light wave $u_i$ emitted by that plane. Advantageously, it is stored in a memory M1.

In E5, it is tested whether the current plane is the last plane, i.e. whether $i=N_z-1$. If it is not so, i is incremented and the steps described previously for the following plane are repeated.

If $i=N_z-1$, the system goes on to step E7. During that step, the propagation of the light wave $u_{N_z-1}$ emitted by the last plane $P_{N_z-1}$ on the hologram plan, is calculated according to the field-based propagation technique and the result is the hologram H.

The E4 treatment step will now be detailed in conjunction with FIG. 4, for a field-based plane, for example the plane $P_3$, then for a point-based plane, for example $P_2$.

In E41, among the previous, already processed planes, the nearest field-based plane or the last field-based plane is identified. In the example of FIG. 3, this is the plane P0. Thereunder, it will be allocated the index I, with I an integer between 0 and Nz−1.

In E42, the light wave emitted by the scene included in the portion plane $P_i$ is calculated.

Each plane $P_i$ functions as a light source which emits a complex wave $o_i$, given by:

$$o_i(x,y) = a_i(x,y) \exp[j\varphi_i(x,y)] \quad (2)$$

where $a_i(x, y)$ is the amplitude of the point at coordinates (x, y) in the plane P and $\varphi i(x, y)$ is its phase, randomly initialized to render a diffuse scene.

The amplitude $a_i(x, y)$ is calculated by using an illumination model, for example the one described by Phong in the article "Illumination for Computer Generated Pictures" published in the volume 18, issue 6 of the journal entitled "Communications of the ACM", pages 311-317, in 1975.

In E44, the propagation of complex light waves emitted by the previous planes from the previous planes from the previous field-based plane PI on Pi−1, is calculated, namely in the example of FIGS. 3 P0, P1 and P2, until the current plane Pi according to the propagation technique T1 or T2 chosen for each previous plane.

For the field-based plane $P_I = P_0$, the propagation of light to the plane is calculated using the angular spectrum formula known to those ordinary skill in the art and described by Goodman in the book "Introduction to Fourier Optics", pages 55 to 58 and published by Roberts and Company Publishers in 2005.

The angular spectrum expresses the propagation of a light wave between two parallel planes separated by a distance z by:

$$P_z^w\{o\}(x,y) = \mathcal{F}^{-1}\{\mathcal{F}\{o\}\exp(-j2\pi \sqrt{\lambda^{-2} - f_X^2 - f_Y^2} z)\}(x,y) \quad (3)$$

where $\lambda$ is the wavelength of the light, $f_X$ and $f_Y$ are the spatial frequencies, and $\mathcal{F}$ and $\mathcal{F}^{-1}$ are respectively the Fourier Transform and the Inverse Fourier Transform. These transforms may be calculated using a Fast Fourier Transform (FFT) algorithm. The algorithmic complexity of the operator $P^w$ is therefore $O(N^2 \log(N))$.

In the following, the operator of propagation of a light wave according to field-based technique on a distance z will be designated by $P_z^w$.

The propagation of the light wave $u_0 = o_0$ of the plane $P_0$ on the plane $P_i$ can be expressed as follows:

$$u_i^w(x,y) = P_{z_{max}-id_z}^w\{u_0\}(x,y) = \mathcal{F}^{-1}\{\mathcal{F}\{u_0\}\exp(-j2\pi \sqrt{\lambda^{-2} - f_X^2 - f_Y^2}(z_{max}-id_z))\}(x,y) \quad (4)$$

Considering now the propagation of light waves emitted by the intermediate planes $P_j$, with j an integer between l+1 and i−1. In the example of FIG. 3, the planes $P_1$ and $P_2$ are point-based planes. The light wave emitted by the intermediate plane $P_j$ is designated by $u_j$. The light wave $u_j$, $u_2$ is obtained by implementing the processing step E4 according to the invention in the case of a "point-based" plane. It will be detailed below.

The propagation of the light wave $u_1$ of the point-based plane $P_1$ on the plane $P_i$, i=3 is therefore calculated by using the first, so-called point-based technique.

The propagation of the light wave $u_j$ of the point-based plane $P_j$ on the plane $P_i$, i=3 is therefore calculated by using the first, so-called point-based technique.

According to the point-based approach, the points of the scene located in each plane are considered as spherical light sources and the propagation of the light from this plane to the plane Pi is calculated as the sum of the spherical waves emitted by each of the planes points of the plane. The spherical wave emitted by a light point k with coordinates $(x_k, y_k, z)$ is given by an angular spectrum formula known to those ordinary skill in the art and e.g. described in the book by Goodman, entitled "Introduction to Fourier Optics", pages 57 to 61 and published by Roberts and Company Publishers in 2005, as follows:

$$w_k(x, y) = o(x_k, y_k) \mathcal{F}^{-1}\{e^{-j2\pi\sqrt{\lambda^{-2}-f_X^2-f_Y^2}\,z}\} \otimes \delta(x-x_k, y-y_k) \quad (5)$$

where $o(x_k, y_k)$ is the complex amplitude of the point and $\otimes$ is the convolution operator. The convolution of a function with a Dirac impulse centers it around the impulse. So if we know the term of the Fourier transform of the equation (5) in advance, $w_k$ can be calculated simply by factoring this term with the amplitude of the point, then shifting it spatially. In order to speed up the calculation, it is possible to use a pre-calculated correspondence table T given by $$T(x, y, z) = \mathcal{F}^{-1}\{e^{-j2\pi\sqrt{\lambda^{-2}-f_X^2-f_Y^2}\,z}\} h(x, y, z) \quad (6)$$

h is a window function to restrict the contribution region of a given point equal to one in the contribution region of the point and to zero, elsewhere. This function limits the spatial frequencies of the complex wave to avoid overlapping the spectrum in the hologram. According to the Nyquist criterion, the maximum spatial frequency that can be represented with a step p of sampling is given by $f_{max}=2p^{-1}$.

In connection with FIG. 5, we now consider the contribution region of a bright point (x, y, z) on a plane parallel to the plane of the hologram, for example the current plane $P_i$.

The equation of diffraction grids, known to those ordinary skill in the art, and stated for example in Goodman document already cited, gives the relationship between the maximum spatial frequency fmax and the maximum diffraction angle $\theta$ as $\sin(\theta)=\lambda f_{max}$.

Thus, as illustrated in FIG. 5, the input region of a bright point at depth z is given by the maximum radius $R_{max}$ as $$R_{max} = z\tan(\theta) = z\tan\left(\sin^{-1}\left(\frac{\lambda}{2p}\right)\right) \quad (7)$$

The window function h can thus be defined as $$h(x, y) = \begin{cases} 1 & \text{if } \sqrt{x^2+y^2} < R_{max} \\ 0 & \text{else} \end{cases} \quad (8)$$

To limit its number of pixels, the correspondence table is pre-calculated only in the square circumscribed about the disk defined by the window function h. Thus, the number of pixels $N_{LUT,z}$ of the correspondence table for the depth z is given by:

$$N_{LUT,z} = \left(\frac{2R_{max}}{p}\right)^2 = \left[\frac{2z}{p}\tan\left(\sin^{-1}\left(\frac{\lambda}{2p}\right)\right)\right]^2 \quad (9)$$

The propagation of light between two parallel planes separated by a distance z is calculated by simply addressing the correspondence table:

$$P_z^s\{o\}(x,y) = \Sigma_{k=0}^{M-1} o(x_k, y_k) T(x-x_k, y-y_k, z) \quad (10)$$

with M the number of light points in the plane. The algorithmic complexity of the operator $P^s$ is thus $O(N^2M)$.

Thus, the propagation of the light wave $u_1$ emitted by the plane $P_1$ on the current plane $P_3$ can be expressed as follows:

$$u_i^{s1}(x,y) = P_{z_{max}-(i-1)d_z}^s\{u_1\}(x,y) = \Sigma_{k=0}^{M1-1} u_1(x_k, y_k) T(x-x_k, y-y_k, z) \quad (11)$$

Likewise, the light wave $u_2$ emitted by the plane $P_2$ on the current plane $P_3$ can be expressed as follows:

$$u_i^{s2}(x,y) = P_{z_{max}-(i-2)d_z}^s\{u_2\}(x,y) = \Sigma_{k=0}^{M2-1} u_1(x_k, y_k) T(x-x_k, y-y_k, z) \quad (12)$$

Thus, the light wave 14 propagated by the point-based intermediate planes $P_{l+1}$ to $P_{i-1}$, on the field-based plane $P_i$, in the example $P_1$, $P_2$, can be expressed as follows:

$$u_i^s(x,y) = \Sigma_{j=l}^{i-1} P_{(i-j)d_z}^s\{u_j\}(x,y) = \Sigma_{j=l+1}^{i-1} \Sigma_{k=0}^{Mj-1} u_1(x_k, y_k) T(x-x_k, y-y_k, z) \quad (13)$$

It is understood that according to this embodiment of the invention, the light waves $o_j$ emitted by all previous planes have been propagated from the field-based plane $P_i$ directly on the current field-based plane.

An advantage of the proposed solution is that it deals only with the propagation of a light wave of a field-based plane to another field-based plane or a point-based plane on a field-based plane, which are relatively simple to calculate.

In E45, occulting the light waves $u_j^s$ is considered with j=l+1 to i−1 and $u_l^w$ propagated in the previous planes by the portion of scene comprised in the current plane $p_i$.

Within the framework of the processing of the field-based current, the suggested approach implements a binary mask. In connection with FIG. 6, by way of illustration we consider an occulting obstacle located in the current plane $P_{d+1}$. A portion of the light wave $u_d$ from the plane $P_d$, cannot go through the occulting obstacle. The amplitude of the light wave $u_d$ thus becomes zero in this region. This can advantageously be taken into account by multiplying the incident light wave by a binary mask $m_{d+1}$, which takes the value zero within the obstacle and one outside. If the points situated in the plane $P_{d+1}$ also emit a wave $o_{d+1}$, the complex wave $u_{d+2}$ incident on the plane $P_{d+2}$ is given by $$u_{d+2}(x,y) = P_{dz}\{o_{d+1} + m_{d+1} P_{dz}\{u_d\}\}(x,y) \quad (14)$$

In connection with FIG. 7, the zones of the current plane $P_i$ for which the occulting binary mask $m_i$ equals 0, have been represented as widened line segments. For the points situated outside these zones, the occulting binary mask equals 1.

In the case of the field-based plane Pi, this method is generalized and the occulting of the light waves propagated since the previous planes $P_l$ to $P_{i-1}$ calculated by multiplying those by the binary mask $m_i$, according to the formula $$\hat{u}_i(x,y) = m_i(x,y)[u_i^w(x,y) + u_i^s(x,y)] = m_i(x,y)[\Sigma_{j=l+1}^{i-1} P_{(i-j)d_z}^s\{u_j\}(x,y) + P_{(i-l)d_z}^w\{u_l\}(x,y)] \quad (15)$$

In $E_{46}$, the total light wave emitted in the current field-based plane $P_i$, in the example $P_3$, is calculating by summing the light wave $o_i$ emitted by the portion of scene comprised in the plane $P_i$ and the light waves propagated since the previous planes $P_i$ to $P_{i-1}$, in the example $P_0$, $P_1$, $P_2$, to which the occulting mask mi of the plane $P_i$, has been applied to the following formula:

$$u_i(x,y)=o_i(x,y)+m_i(x,y)[u_i^w(x,y)+u_i^s(x,y)] \quad (16)$$

We shall now consider the case of a current point-based plane $P_i$. We understand that, according to the invention, this plane $P_i$ is a plane spaced between two successive field-based planes, a previous plane $P_l$, with l<i and a following plane $P_d$, with d>i, as illustrated by FIG. 8.

The processing step $E_4$ implements the substep $E_{42}$ already described of calculating the light wave $o_i$ emitted by the points of the portion of scene comprised in the plane $P_i$ which have a non-zero amplitude according to the equation (2) already described.

In $E_{47}$, the amplitude of the light waves emitted by previous planes from the field-based plane $P_l$ up to the plane $P_{i-1}$, and blocked by occulting obstacles of the scene comprised in $P_i$ is calculated. This again points to the scene that have a non-zero amplitude.

The aim is therefore to manage the occulting of the light waves from the previous planes, a point-based plane.

The inventors have found that, while ideally suited for field-based planes, the light wave of which is calculated using the operator $P^w$, the technique for managing occultations described in connection with FIGS. 6 and 7 for the field-based planes is not at all adapted to the point-based planes. Indeed, this technique requires previously calculating the propagation of light waves step by step, that is to say a previous plan of the current point-based plane. Or, at each diffraction step, the complex wave emitted by the scene extends gradually from one plane to another, and the incident wave on the plane $P_i$ can span a large number of samples. Thus, even if the plane Pi comprises only a small number of points of the scene for which the amplitude of the light wave $o_i$ is different from zero, the total light wave ui' emitted by this plane may have a large number of non-zero values. Each non-zero value of the wave u; is then considered as a spherical light source by the propagation operator $P^s$ previously described. In other words, the incident wave will illuminate a certain number of additional points in the current point-based plane and complicate further processing of this plane. But as we have seen, the algorithmic complexity of $P^s$ depends on the number of spherical light sources in the source plane. The use of the previous technique for taking occultation into account might render completely the very principle of the invention ineffective, namely to choose the processing method suited to a plane based on the number of non-zero amplitude points in the portion of the scene it contains.

The invention proposes a different approach, tailored to the point-based planes. It consists in calculating the amplitude of the light wave from the previous planes only for the non-zero-amplitude points of the scene of the current plane Pi'. Advantageously, this calculation is based on an inverted binary mask. It provides the amplitude of the light wave blocked by the current plane. In connection with FIG. 8, it is considered an occulting obstacle situated in the plane $P_{d+1}$ and an inverted binary mask is used, defined by $$a_{d+1}(x,y)=1-m_{d+1}(x,y) \quad (17)$$

By substituting $m_{d+1}$ in the equation (14) with the expression of $a_{d+1}$ according to the equation (17), $u_{d+2}$ becomes:

$$u_{d+2}(x,y)=P_{dz}\{o_{d+1}+(1-a_{d+1})P_{dz}\{u_d\}\}(x,y)$$

$$u_{d+2}(x,y)=P_{2dz}\{u_d\}(x,y)+P_{dz}\{o_{d+1}-a_{d+1}P_{dz}\{u_d\}\}(x,y)$$

$$u_{d+2}(x,y)=P_{2dz}\{u_d\}(x,y)+P_{dz}\{\hat{u}_{d+1}\}(x,y) \quad (18)$$

Calculating $u_{d+2}$ by using the inverted binary mask requires employing three times the propagation operator P, whereas it is necessary to use it only twice with the binary mask m. However, the digital propagation from plane $P_d$ to plane $P_{d+1}$ only needs to be calculated in the region defined by the inverted binary mask $a_{d+1}$, which corresponds to the coordinates of the points of the scene situated in the plane $P_{d+1}$. The point-based propagation operation $P^s$ is therefore used, even for the previous field-based plane PI. Thus, the number of non-zero values of $\hat{u}_{d+1}$ is the same as the number of points of the scene for which the amplitude of the wave $o_{d+1}$ is different from zero. The use of the inverted binary mask does not, advantageously, increase the number of spherical light sources, the wave of which must be calculated at each diffraction pitch. This technique is thus extremely efficient for managing the occultations by the point-based planes.

The management technique of the occultations is generalized for the current point-based plane $P_i$ by the following formula:

$$ub_i(x,y)=a_i(x,y)\Sigma_{j=l}^{i-1}P_{(i-j)dz}^s\{u_j\}(x,y) \quad (19)$$

where $u_{bi}$ is the light wave propagated from the previous planes and blocked by the points of the scene with non-zero amplitude of the point-based plane $P_i$.

In E48, the total light wave u; emitted from the plane Pi is calculated by subtracting the waveform $o_{bi}$ blocked at the light wave emitted by the scene portion lying in the plane $P_i$.

$$u_i(x,y)=o_i(x,y)-ub_i(x,y)=o_i(x,y)-a_i(x,y)\Sigma_{j=l}^{i-1}$$
$$P_{(i-j)dz}^s\{u_j\}(x\,y) \quad (20)$$

It is understood that subtracting from the amplitude of the light wave emitted by the current point-based plane $P_i$ the amplitude of the light wave from the previous plans and blocked by the current plane enables to transmit to the field-based plane the next field information of what has been occulted in the intermediate plane $P_i$.

The value of the light wave $u_i$ obtained for the point-based plane $P_i$ contributes to the calculation of the light wave $u_d^s$ emitted by the point-based intermediate planes $P_j$, with j=l+1, . . . d−1 and propagated on the plane Pd. It is then exploited to calculate the total light wave emitted ud by the next field-based plane Pd, according to the equation (16) described previously:

$$u_d(x,y)=o_d(x,y)+m_d(x,y)[u_d^w(x,y)+u_d^s(x,y)] \quad (16)$$

In this manner, having propagated the light waves emitted by the previous planes without taking into account the occultations by the intermediate planes is compensated for at the field-based plane $P_d$.

Figure 2:
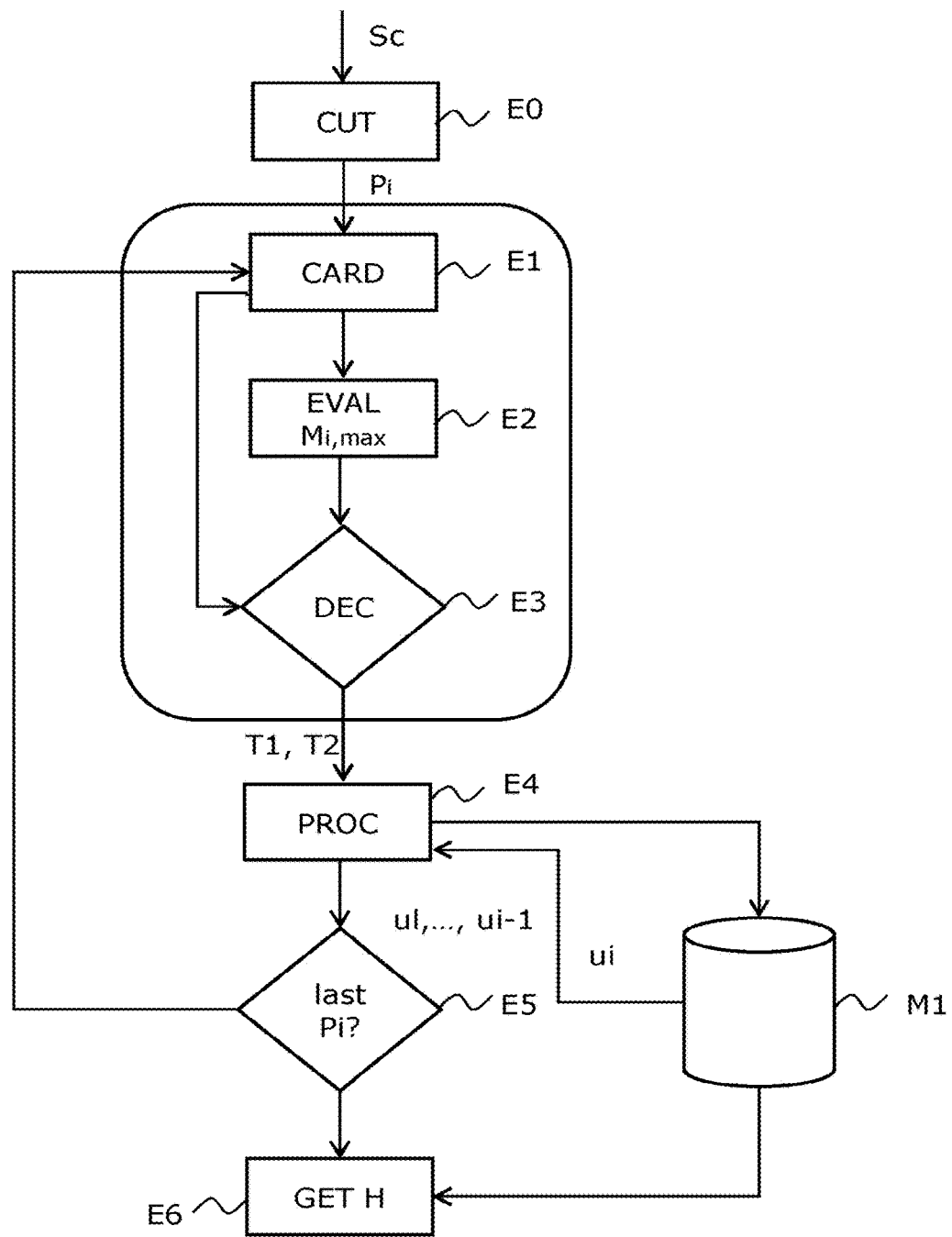
FIG. 2 shows schematically the steps of a method for digitally generating a hologram according to an embodiment of the invention.

In connection with FIG. 2, let us now return to step $E_2$ for evaluating a threshold for the current plane $P_i$ according to an embodiment of the invention.

In order to implement the proposed method, the threshold value $M_{d,max}$ must be determined experimentally. By $T_i^s$ is designated the time necessary to calculate the propagation and the occultation of the light wave from the scene by the plane Pi comprising $M_i$ light points by using the point-based approach and $T_i^w$ the time necessary to this calculation by using the field-based approach. $T_i^s$ corresponds to the sum of the time necessary to calculate the occultation of the light wave by the plane Pi by using the technique of the inverted binary mask (step E47) and of the time necessary to the calculation of the propagation of the light wave emitted by the plane $P_i$ by using the operator $P^s$ (step E44):

$$T_d^s = \alpha M_d M + \beta M_d N^2 \qquad (21)$$

where $\alpha$ and $\beta$ are constant coefficients, M is the total number of points of the scene situated in the planes with index j ranging between 1 and i−1 and $N^2$ the total number of pixels of the hologram H:

$$M = \sum_{j=1}^{i-1} M_j \qquad (22)$$

$T_i^w$ is given by $$T_i^w = \gamma N^2 \log(N)$$

where $\gamma$ is a constant coefficient. $\alpha$, $\beta$ and $\gamma$ must be determined experimentally and depend on the capacities and performances of the system on which the method is carried out, especially in terms of calculation power.

For example, we indicate below two values adapted to our system:

$\alpha=1$, $\beta=2$ and $\gamma=5.35\cdot10^{-8}$

For maximized efficiency of our method, the threshold value $M_{d,max}$ is set as $$T_d^S = T_d^W \Leftrightarrow M_{d,max} = \frac{\gamma N^2 \log(N)}{\alpha M + \beta N^{\wedge}2} \qquad (23)$$

An advantage of this embodiment of the invention is that it allows to determine the most appropriate technique for processing the current plane on the basis of a realistic comparison of the calculation times associated with both competing methods.

Note that the evaluation of the threshold may advantageously be implemented in a first pre-processing step of the plurality of planes. Indeed, according to the embodiment of the invention which has just been described, the number of point per point-based plane taken into account in the process remains unchanged and equals the number of non-zero-amplitude points of the original scene Sc.

Note also that alternatively the threshold $M_{d,max}$ could just as well be assessed from estimates of computational complexity of the first and second method to the current plane rather than from estimated calculation times, in order to remain independent from possible optimized implementations of the method on a particular system.

In connection with FIG. 9, an embodiment of the invention will now be described, to simplify the step $S_{47}$ of calculating the amplitude $o_{bi}$ blocked by the points of the scene portion within a point-based intermediate plane $P_i$.

Let us consider a point-based plane $P_i$ and a previous plane $P_{i-1}$. The occulting plane $P_i$ is divided into zones A to H. For example, these zones have simple geometric shapes, typically rectangular and have all the same dimensions.

In the example of FIG. 9, we consider the points $q_1$, $q_2$, $q_3$ and $q_4$ of the plane Pi, arranged so that:
$q_2 \in A$;
$q_1 \in B$;
$q_3, q_4 \in C$;

It can be noted that the zones D, E, F, G and H are empty.

In the previous plane Pi−1, we consider the points $q_k$, with k an integer between 1 and 5. For each point $p_n$, n is an integer between 1 and 4, the plane $P_{i-1}$ enables to calculate on which zones of the plane Pi its emitted light extends. This is done by exploiting the contribution zone of a spherical light wave described above in connection with FIG. 5. Advantageously, the zones of the plane Pi which have a non-zero intersection with the disk of radius Rmax projected from the previous plane Pi−1 Pi on the current plane Pi. For example, it can be seen that the point $p_1$ emits on the zones B and D.

For each zone of the plane Pi, we define a list l including the points $p_k$ of the plane $P_{i-1}$ which light up:
l(A)={$p_2$};
l(B)={$p_1$};
l(c)={$p_2$, $p_4$};
l(D)={$p_1$, $p_2$, $p_3$}
l(E)={$p_4$, $p_5$};
l(F)={$p_3$, $p_5$};
l(G)={$p_5$};
l(H)={$p_5$}.

Each point $q_j$ of the plane Pi therefore only occults the light from the points $p_k$ of the plane $P_{i-1}$ which illuminate the zone in which it is situated. For example, the point $q_1 \in B$ only occults the light from the points comprised in the list l(B), i.e. only the light from $p_1$.

In this way, we calculate the amplitude ob of the light wave blocked by the scene portion included in the plane $P_i$ only for the points $P_{i-1}$ that effectively contribute to illuminate the zones of $P_i$ including points of the non-zero amplitude scene. The computational complexity of step E47 is therefore reduced.

It will be noted that the invention just described, can be implemented using software and/or hardware components. In this context, the terms "module" and "entity" used in this document, can be either a software component or a hardware component or even a set of hardware and/or software, capable of implementing the functions outlined for the module or entity concerned.

In connection with FIG. 10, we now present an example of simplified structure of a device 100 for digitally generating a hologram from a three-dimensional scene according to the invention. The device 100 implements the method for digitally generating a hologram according to the invention which has just been described in connection with FIGS. 2 and 4.

For example, the device 100 comprises a processing unit 110, equipped with a processor μ1 and driven by a computer program Pg1, 120 stored in a memory 130 and implementing the method according to the invention.

At initialization, the computer program code instructions Pg$_1$ 120 are for example loaded into a RAM before being executed by the processor of the processing unit 110. The processor of the processing unit 110 implements the steps of the method described previously, according to the instructions of the computer program 120.

In this embodiment of the invention, the device 100 comprises at least one unit CARD for counting a number of points of the non-zero amplitude scene in the current plane, a unit DEC for choosing a first or a second technique for propagating a light wave emitted by the current plane as a function of a number of points of non-zero amplitude of the scene portion comprised in the current plane and with a preset threshold value, the first, so-called point-based technique for calculating the propagation of a sum of light waves emitted by point sources constituted by the points of the scene portion of a non-zero amplitude of the current plane on a following plane, the second, so-called field-based technique, adapted to globally calculate a light wave emitted by the scene portion situated in the current plane on a given plane, a processing unit of the current plane according to the propagation technique selected, adapted to calculate a light wave emitted by the current plane and a unit GET H for obtaining the hologram from light waves calculated for the plurality of planes.

Advantageously, the unit PROC for processing the current plane includes identification subunits of the last processed field-based plane, calculating the light wave emitted by the scene portion comprised in the current plane and optionally, according to the technique selected, a sub-unit for calculating the propagated light wave of previous planes, a subunit for calculating the light wave occulted by the current plane and a sub-unit for calculating the total light wave u; emitted by the current plane.

The device 100 further comprises a unit $M_1$ for storing light waves calculated for the plurality of planes.

These units are controlled by the processor µ1 of the processing unit 110.

Advantageously, such a device 100 can be integrated into a user terminal TU. For example, such a device can be a personal computer, a tablet, a smart phone or any hardware and/or software system including sufficient computational resources to implement the method according to the invention. Such terminal further comprises a control module through connection means, wired or not, a playback device DR, such as a 2D, 3D or 3D holographic television set, capable of reproducing the hologram generated by the method according to the invention. Of course, for a non-holographic playback device, it is necessary to provide, for example within the control module MC, an intermediate processing for adapting the generous light field to make it viewable on the playback device DR.

The invention that has just been presented makes it possible to digitally generate a hologram of the light field from a three-dimensional scene. In connection with FIG. 11, we now present another example of a possible use of the invention. It is considered that a first hologram H has been generated using the method of the invention or another method. We do not know a priori the first scene at the origin of the hologram H. In the so-called enhanced holography scenario considered, a second scene is to be integrated with at least one additional item in front of the first scene. In the example of FIG. 11, the second scene is limited to an object, in this case a rabbit.

To integrate properly in the scene, the rabbit must properly occult the elements of the first scene which are situated behind him. As we do not know the first scene corresponding to the hologram H, it is impossible to use visibility tests between the rabbit and the other elements of the scene.

It is proposed to implement the method for generating a light field hologram according to the invention by cutting the second scene into a plurality of equidistant planes starting from the plane of the hologram H, such that $P_0=H$. The plurality of planes comprises Nz planes which are processed according to the invention as field-based planes or point-based planes, the plane $P_0=H$ and the plane $P_{Nz-1}$ being field-based planes.

The new hologram H' is obtained by propagation of the light wave $u_{Nz-1}$ calculated for the last field-based plane $P_{Nz-1}$ on the plane of the hologram H'.

Then the light field H' obtained in the plane H may optionally be propagated to maintain the position of the original hologram and cause the second scene to appear in front of the first scene.

An exemplary embodiment of the present invention improves the situation discussed above with respect to the prior art.

An exemplary embodiment overcomes the shortcomings of the prior art.

An exemplary embodiment proposes a solution which enables a hologram to be generated from a real scene at a lower cost in terms of computational resources than the existing techniques.

An exemplary embodiment proposes a solution that is also capable of effectively managing the occultations of the scene.

It goes without saying that the embodiments which have been described above have been given by way of purely indicative and non-limiting example, and that many modifications can be easily made by those having ordinary skill in the art without departing from the scope of the invention.

The invention claimed is:

1. A method comprising:
   digitally generating a hologram in a hologram plane from a three-dimensional scene comprising the following steps performed by a digital processing device:
   a step of cutting said scene into a plurality of planes parallel to the hologram plane;
   performing the following processing steps, implemented for a current plane of at least some of the plurality of planes, which are processed successively from the plane that is farthest relative to the hologram plane to the plane that is closest relative to the hologram plane:
      counting a number of points of non-zero amplitude of the scene in the current plane;
      choosing a point-based first propagation technique or a field-based second propagation technique for propagating a light wave emitted by the current plane as a function of a number of points of non-zero amplitude of a portion of the scene comprised in the current plane and of a preset threshold value, wherein the point-based first technique calculates propagation of a light wave, which is a sum of respective light waves emitted by point sources constituted by points of the scene portion of a non-zero amplitude of the current plane, on a following plane, and the field-based second technique calculates globally propagation of a light field, which is emitted by the scene portion comprised in the current plane, on a following plane, the point-based first technique being chosen if the number of points is strictly lower than the preset threshold value and the field-based second technique being chosen, otherwise;
      processing the current plane according to the chosen propagation technique, to calculate a light wave emitted by the current plane; and
      repeating said steps of counting, choosing and processing for said at least some of the plurality of planes, from the farthest plane to the nearest plane; and
   a step of obtaining the hologram from the light waves calculated for nearest plane of the plurality of planes.

2. The method for digitally generating a hologram according to claim 1, wherein said processing step of the current plane comprises the following substeps:
   identifying a closest one of any plane processed previously according to the field-based second propagation technique, referred to as a previous last field-based plane;
   calculating the light wave emitted by the scene portion comprised in the current plane;

when the field-based second propagation technique has been chosen for the current plane, the processing step comprises the following substeps:
  if the previous field-based plane has been identified, calculating a propagation of the light wave emitted by at least the previous field-based plane on the current plane, according to the field-based second propagation technique;
  calculating the light wave emitted by the current plane by summing the light wave emitted by the current plane and at least the propagation of the light wave emitted by at least the previous field-based plane, if the previous field-based plane has been identified; and
the step of obtaining the hologram comprises calculating the propagation of the light wave emitted by the plane that is processed by the field-based second propagation technique and that is closest to the hologram plane.

3. The method for digitally generating a hologram according to claim 2, wherein, when at least one plane previously processed comprises at least one point-based intermediate plane, interposed between the previous field-based plane and the current plane, calculating the propagation of the emitted light wave by at least the previous field-based plane on the current plane further comprises calculating a propagation of the light wave emitted by the points of non-zero amplitude of the scene portion comprised in said at least one intermediate plane on the current plane according to the point-based first propagation technique.

4. The method for digitally generating a hologram according to claim 2, wherein:
  the processing step of the current plane comprises a substep of managing an occultation of the light wave propagated through at least the previous field-based plane in the current plane by applying a binary mask obscuring said light wave, said mask assuming a zero value at the points of the scene portion included in the current plane and a non-zero value outside this portion; and
  the substep of calculating the light wave emitted by the current plane comprises a summation of the light wave emitted by the current plane to the light wave obtained after application of the occulting binary mask.

5. The method for digitally generating a hologram according to claim 2, wherein when the point-based first propagation technique is chosen to process the current plane, the processing step further comprises the following substeps:
  calculating a light wave propagated by at least the previous field-based plane according to the point-based first propagation technique and blocked by the points of non-zero amplitude of the scene portion comprised in the current plane;
  calculating the light wave emitted by the current plane by subtracting the light wave blocked by the points of non-zero amplitude of the scene portion comprised in the current plane at the light wave emitted by said points.

6. The method for digitally generating a hologram according to claim 5, wherein the substep of calculating the blocked light wave comprises calculating the light waves propagated at least by the previous field-based plane according to the point-based first propagation technique and applying an inverted occulting binary mask to the calculated light wave, said mask assuming a non-zero value at the points of the scene portion comprised in the current plane and a zero value outside this portion.

7. The method for digitally generating a hologram according to claim 6, wherein the substep of calculating the blocked light wave comprises cutting the current plane into a plurality of zones, determining the points of a plane of the plurality of planes, which was processed previously to the current plane from the previous field-based plane, that contribute to the propagation of a light wave in a zone of the plurality of zones comprising points of non-zero amplitude of the scene portion comprised in the current plane, the blocked light wave being calculated only for the points thus determined.

8. The method for digitally generating a hologram according to claim 1, further comprising a step of evaluating the preset threshold value at least as a function of an estimated processing time for the point-based first propagation technique, of an estimated processing time for the field-based second propagation technique for the current plane, and a number of non-zero amplitude points of the scene portions comprised in the planes processed previously.

9. A device for digitally generating a hologram in a hologram plane from a three-dimensional scene, the device comprising:
  a processing unit; and
  a non-transitory computer-readable medium comprising instructions stored thereon, which when executed by the processing unit configure the processing unit to:
  cut said scene into a plurality of planes parallel to the hologram plane,
  perform the following for a current plane of at least some of the plurality of planes, which are processed successively from the plane that is farthest relative to the hologram plane to the plane that is closest relative to the hologram plane:
    counting a number of points of the non-zero amplitude scene in the current plane;
    choosing a point-based first propagation technique or a field-based second based propagation technique for propagating a light wave emitted by the current plane as a function of a number of points of non-zero amplitude of the portion of the scene comprised in the current plane and of a preset threshold value, wherein the point-based first propagation technique calculates propagation of a light wave, which is a sum of respective light waves emitted by point sources constituted by points of the scene portion of a non-zero amplitude of the current plane on a following plane, and the field-based second propagation technique calculates globally the propagation of a light field, which is emitted by the scene portion included in the current plane, on a following plane, the point-based first propagation technique being chosen if the number of points is strictly lower than the preset threshold value and the field-based second propagation technique being chosen, otherwise;
    processing the current plane according to the chosen propagation technique, to calculate a light wave emitted by the current plane;
    repeating the counting, choosing and processing for said at least some of the plurality of planes from the farthest plane to the nearest plane; and
  obtain the hologram from the light waves calculated for nearest plane of the plurality of planes.

10. A user terminal comprising a control module of a playback device of a hologram and the device for digitally generating said hologram according to claim 9.

11. A non-transitory processor-readable recording medium, comprising a computer program stored thereon, which comprises instructions for performing a method of digitally generating a hologram in a hologram plane from a three-dimensional scene, when the instructions are executed by a processor, wherein the method comprises:

cutting said scene into a plurality of planes parallel to the hologram plane;

performing the following steps, implemented for a current plane of at least some of the plurality of planes, which are processed successively from the plane that is farthest relative to the hologram plane to the plane that is closest relative to the hologram plane:

counting a number of points of non-zero amplitude of the scene in the current plane;

choosing a point-based first propagation technique or a filed-based second propagation technique for propagating a light wave emitted by the current plane as a function of a number of points of non-zero amplitude of the portion of the portion comprised in the current plane and of a preset threshold value, wherein the point-based first propagation technique calculates propagation of a light wave, which is a sum of respective light waves emitted by point sources constituted by points of the scene portion of a non-zero amplitude of the current plane on a following plane, and the field-based second propagation technique calculates globally propagation of a light field, which is emitted by the scene portion comprised in the current plane, on a following plane, the point-based first propagation technique being chosen if the number of points is strictly lower than the preset threshold value and the field-based second propagation technique being chosen, otherwise;

processing the current plane according to the chosen propagation technique, to calculate a light wave emitted by the current plane; and repeating said steps of counting, choosing and processing for said at least some of the plurality of planes from the farthest plane to the nearest plane; and obtaining the hologram from the light waves calculated for nearest plane of the plurality of planes.

12. A method comprising:

digitally generating a hologram in a hologram plane from a three-dimensional scene comprising the following steps performed by a digital processing device:

a step of cutting said scene into a plurality of planes parallel to the hologram plane, including a farthest plane and a nearest plane relative to the hologram plane;

a step of processing the farthest plane according to a field-based second propagation technique, to calculate a light wave emitted by the farthest plane;

performing the following processing steps, implemented for a current plane between the farthest plane and the nearest plane of the plurality of planes, which are processed successively from the farthest plane to the nearest plane:

counting a number of points of non-zero amplitude of the scene in the current plane;

choosing a point-based first propagation technique or the field-based second propagation technique for propagating a light wave emitted by the current plane as a function of a number of points of non-zero amplitude of a portion of the scene comprised in the current plane and of a preset threshold value, wherein the point-based first technique calculates propagation of a light wave, which is a sum of respective light waves emitted by point sources constituted by points of the scene portion of a non-zero amplitude of the current plane, on a following plane, and the field-based second technique calculates globally propagation of a light field, which is emitted by the scene portion comprised in the current plane, on a following plane, the point-based first technique being chosen if the number of points is strictly lower than the preset threshold value and the field-based second technique being chosen, otherwise;

processing the current plane according to the chosen propagation technique, to calculate a light wave emitted by the current plane; and repeating said steps of counting, choosing and processing for the plurality of planes between from the farthest plane and the nearest plane;

a step of processing the nearest plane according to the second, field-based propagation technique, to calculate a light wave emitted by the nearest plane; and a step of obtaining the hologram from the light waves calculated for nearest plane of the plurality of planes.

* * * * *